April 28, 1942.  J. W. DAWSON  2,280,800
ARC WELDING DEVICE
Filed Oct. 11, 1940
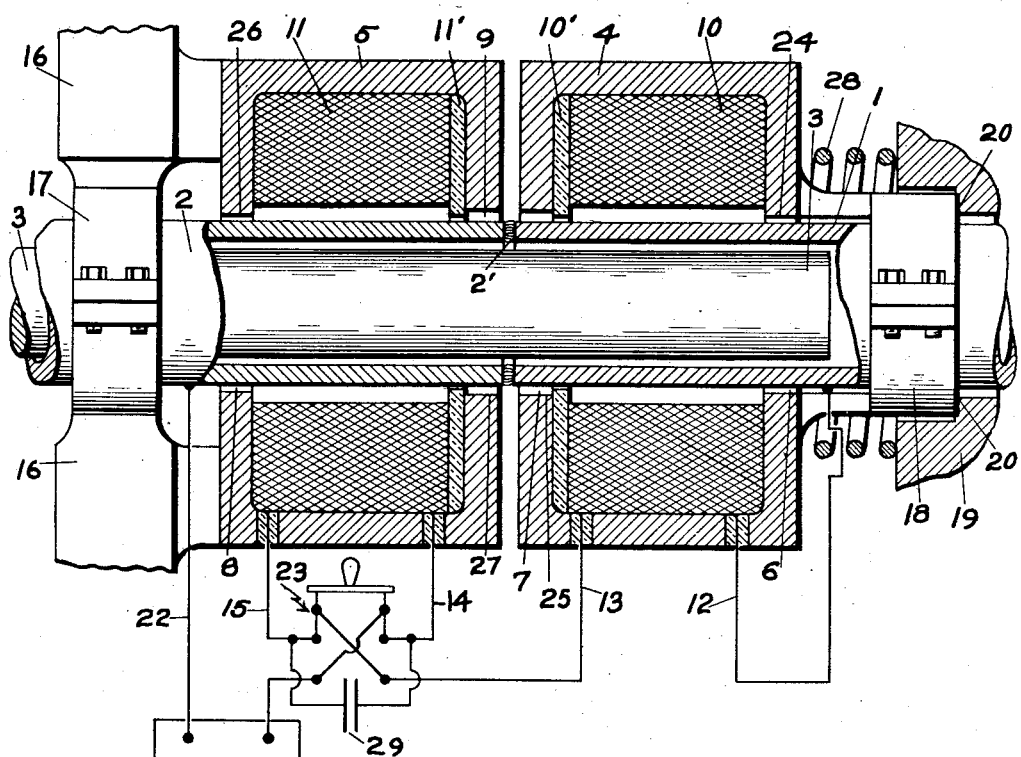
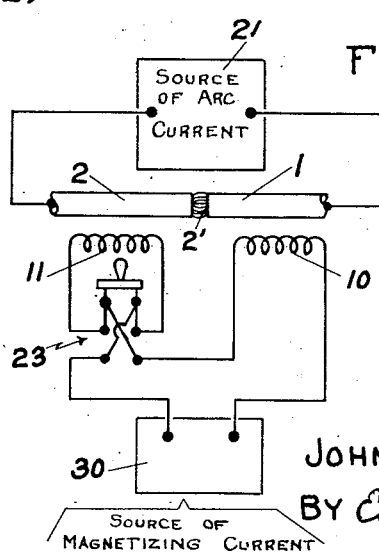
INVENTOR.
JOHN W. DAWSON,
BY Elmer J. Goin
ATTY.

Patented Apr. 28, 1942

2,280,800

UNITED STATES PATENT OFFICE 2,280,800

ARC WELDING DEVICE

John W. Dawson, Auburndale, Mass., assignor to Raytheon Manufacturing Company, Newton, Mass., a corporation of Delaware Application October 11, 1940, Serial No. 360,795

9 Claims. (Cl. 219—4)

This invention relates to an arc welding device, particularly as applied to the invention as described and claimed in the copending application of Laurence K. Marshall and John W. Dawson on "Arc welding system and method," filed simultaneously herewith. In said application there is described and claimed a system in which an arc is dispersed by means of magnetic fields over relatively extended areas of two members to be welded, whereby said surfaces are heated and then moved into welding engagement with each other.

An object of this invention is to produce a device in which the proper movement of work pieces in an arc welding system is produced by the reaction of such magnetic fields.

Another object is to reverse the polarity of opposing pole pieces to produce attraction and repulsion thereof for securing corresponding motion of the parts of the device.

A further object is to produce the foregoing actions by passing the arc current through the coils which are used to set up the magnetic fields.

The foregoing and other objects of this invention will be best understood from the following description of exemplifications thereof, reference being had to the accompanying drawing, wherein:

Fig. 1 is a cross-sectional view of a device embodying my invention, together with a diagrammatic circuit which may be used therein; and Fig. 2 is a diagrammatic circuit illustrating a modified form of the arrangement shown in Fig. 1.

In the drawing, two metal bodies 1 and 2, which are shown in the form of tubes or pipes, are to be welded to each other along their adjacent edges so as to form a continuous tube or pipe. The pipes 1 and 2 are held spaced apart so as to provide an annular gap 2' in which an arc is to be established. A rod 3 of magnetic material is inserted inside the pipes 1 and 2 so as to extend past the gap 2' to a point substantially beyond said gap. The rod 3 is preferably coated with a refractory insulating material to prevent the arc current from flowing through the rod 3 and to provide a refractory surface for withstanding the heat of the arc. Surrounding the pipes 1 and 2 respectively are two magnetic shells 4 and 5. These shells are provided with aligned openings 6 and 7 and 8 and 9, respectively, so that the pipes 1 and 2 may be inserted therein. The edges of the openings 6, 7, 8 and 9 provide pole pieces 24, 25, 26 and 27, respectively. In order to energize said pole pieces, annular coils 10 and 11 are placed respectively in the inner annular space provided in the magnetic shells 4 and 5. If desired refractory washers 10' and 11' may be placed at one end of each of the coils 10 and 11 to shield and protect said coils against the heat generated by the arc in the gap 2'. Also the faces of the pole pieces 25 and 27 may be coated with refractory material for the same purpose. The terminals of the coils 10 and 11 are provided with leads 12, 13, 14 and 15, respectively, said leads passing through insulating bushings to the exterior of the shells 4 and 5.

The shell 5 is held in a stationary position by being mounted upon a pair of base members 16—16. These members also carry a clamping ring 17 in which the pipe 2 may be securely fastened. The shell 4, however, is movable and carries a clamping ring 18 in which the pipe 1 may be securely held. The clamping ring 18 moves in a stationary guide member 19 provided with a pair of stop shoulders 20—20. In order to tend to make the shell 4 and the pipe 1 move toward the shell 5 and the pipe 2, a compression spring 28 may be interposed between the guide member 19 and the shell 4.

In order to establish and maintain the arc in the gap 2', a source of arc current 21 is provided. This source may supply current of any suitable nature which may be in the form of direct current or alternating current, or any specialized current form particularly adapted for the purpose for which it is to be used. In the present arrangement, however, I prefer to have the source 21 supply direct current. One terminal of the source 21 is connected by a conductor 22 to the pipe 2. The other terminal of said source is connected through a reversing switch 23 through the coils 11 and 10 in series. The lead 12 for the coil 10 is electrically connected to the pipe 1. If necessary a condenser 29 may be connected across the reversing switch 23 in order to avoid sparking or arcing at the contacts of said switch.

With the switch 23 in its open position or with the source 21 deenergized, the spring 28 will cause the adjacent ends of the pipes 1 and 2 to contact each other. When the source 21 is energized and the switch 23 is closed in the position as shown, current will flow from the source 21 through one side of the reversing switch 23, conductor 14, coil 11, conductor 15, the other side of said reversing switch 23, conductor 13, coil 10, conductor 12, pipe 1, pipe 2, conductor 22, back to the other side of said source 21. The coils 10 and 11 are wound in such a direction as to make the adjacent pole pieces 25 and 27 the same polarity under these conditions. These pole pieces, therefore, will exert a strong repulsive force upon each other, and therefore the shell 4 carrying the pipe 1 will be moved away from the shell 5 and the pipe 2 until the ring 18 contacts the stop shoulders 20—20. Due to this motion the adjacent ends of the pipes 1 and 2 will be separated, whereby an arc will be initiated between said adjacent ends. An "arc" in the sense as used in the specification and claims is an electrical space discharge which occurs between two separated surfaces of sufficient intensity to produce substantial heating of the surface between which the discharge passes. As pointed out in said copending application, the pole pieces 25 and 27 produce a flux passing radially through the gap 2', which causes a dispersion of the arc throughout said gap, probably by causing the arc to move at high speed along said gap. The arc is permitted to continue until the adjacent surfaces of the pipes 1 and 2 have been heated to the proper temperature. Thereupon the switch 23 is moved so as to reverse the connections to the coil 11. Preferably, in addition to the condenser 29, the switch 23 is of the quick-acting type so as to avoid the tendency for an arc to form across the contacts of said switch. Upon operation of the reversing switch 23, the arc in the gap 2' will tend to be extinguished and the fields in the magnetic shells 4 and 5 will tend to disappear. However the spring 28 will move the adjacent ends of the pipes 1 and 2 into engagement with each other. The pressure which the spring 28 exerts may be quite slight. However, upon the reversal of the switch 23, the circuit for current flow is reestablished. Under these conditions the adjacent pole pieces 25 and 27 are of opposite polarity, and therefore these pole pieces exert a very strong attraction for one another. The ends of the pipes 1 and 2 each projects a slight distance beyond the outer faces of the shells 4 and 5, and therefore the attraction of the poles 25 and 27 will force the heated ends of the pipes 1 and 2 into sufficiently energetic engagement with each other to produce complete welding of said adjacent surfaces.

Instead of having the arc current flow through the coils 10 and 11, said coils may be separately energized, as indicated in Fig. 2. In this figure the source of arc current 21 is connected directly between the pipes 1 and 2. A separate source of magnetizing current 30 is connected in series with the coils 10 and 11. Any suitable type of current supply may be chosen for the sources 21 and 30.

In the arrangement shown in Fig. 2, the arc between the pipes 1 and 2 may be initially started in any suitable manner, as, for example, by manually bringing said pipes into momentary engagement with each other. Under these conditions, the spring 28 need not be used. As in the case of Fig. 1, the repulsion between the adjacent pole pieces will force the pipes 1 and 2 apart and maintain them in separated position throughout the heating period. Upon reversal of the switch 23, the pipes 1 and 2 may remain in their separated position during such reversal. However, when the field, due to the coil 10, has been reversed, the attraction of the adjacent pole pieces will bring the ends of the pipes 1 and 2 together and force them into intimate engagement with each other, whereby satisfactory welding is produced.

Of course it is to be understood that this invention is not limited to the particular details as described above as many equivalents will suggest themselves to those skilled in the art. It is accordingly desired that the appended claims be given a broad interpretation commensurate with the scope of the invention within the art.

What is claimed is:

1. A welding system for welding two surfaces spaced apart comprising two magnetic members adapted to be secured to said two work members, said magnetic members having adjacent pole pieces, means for heating said surfaces, and means for energizing said pole pieces, while said surfaces are spaced apart, with opposite polarities to force said surfaces together into welding engagement with each other.

2. A welding system for welding two surfaces spaced apart comprising two magnetic members adapter to be secured to said two work members, said magnetic members having adjacent pole pieces, means for energizing said pole pieces with the same polarity to move said work pieces apart to their spaced positions, means for heating said surfaces, and means for reversing the polarity of said pole pieces with respect to each other to force said surfaces together into welding engagement with each other.

3. A welding system for welding two surfaces spaced apart to form an arc gap comprising two magnetic members adapted to be secured to said two members, said magnetic members having adjacent pole pieces adjacent said arc gap, means for energizing said pole pieces with the same polarity to move said work pieces apart to their spaced positions and to produce a magnetic field transverse to said arc gap, and means for establishing an arc in said arc gap.

4. A welding system for welding two surfaces spaced apart to form an arc gap comprising two magnetic members adapted to be secured to said two work members, said magnetic members having adjacent pole pieces means for establishing an arc in said arc gap, and means for energizing said pole pieces with opposite polarities while said surfaces are spaced apart, to force said surfaces together into welding engagement with each other.

5. A welding system for welding two surfaces spaced apart to form an arc gap comprising two magnetic members adapted to be secured to said two members, said magnetic members having adjacent pole pieces adjacent said arc gap, means for energizing said pole pieces with the same polarity to move said work pieces apart to their spaced positions and to produce a magnetic field transverse to said arc gap, means for establishing an arc in said arc gap, and means for energizing said pole pieces with opposite polarities to force said surfaces together into welding engagement with each other.

6. A welding system for welding two work members with surfaces spaced apart to form an arc gap, comprising two magnetic members adapted to be secured to said two work members, said magnetic members having adjacent pole pieces, a source of arc current for establishing an arc in said arc gap, windings for energizing said pole pieces with the same polarity to move said work pieces apart to their spaced positions, said windings being connected in series with said source, and means for reversing the polarity of said windings with respect to each other to reverse the polarity of said pole pieces and force said surfaces together into welding engagement with each other.

7. In a welding system for welding two work members with surfaces spaced apart to form an arc gap, means for moving said work pieces together, comprising two magnetic members adapted to be secured to said two work members, said magnetic members having adjacent pole pieces, means for energizing said pole pieces with the same polarity to move said work pieces apart to their spaced positions, means for establishing an arc in said arc gap, and means for reversing the polarity of said pole pieces with respect to each other to force said surfaces together into welding engagement with each other.

8. A welding system for welding two surfaces spaced apart comprising two magnetic members adapted to be secured to said two work members, said magnetic members having adjacent pole pieces, means for heating said surfaces, and means for energizing said pole pieces while said surfaces are spaced apart to force said surfaces together into welding engagement with each other.

9. A welding system for welding two surfaces spaced apart to form an arc gap comprising two magnetic members adapted to be secured to said two work members, said magnetic members having adjacent pole pieces, means for establishing an arc in said arc gap, and means for energizing said pole pieces while said surfaces are spaced apart to force said surfaces together into welding engagement with each other.

JOHN W. DAWSON.